United States Patent
Dowdell et al.

(10) Patent No.: US 10,411,992 B2
(45) Date of Patent: Sep. 10, 2019

(54) ROUTING DATA WITHIN A COMMUNICATIONS NETWORK

(71) Applicant: Airbus Defence and Space Limited, Stevenage (GB)

(72) Inventors: John Paul Dowdell, Newport Gwent (GB); David Rees, Newport Gwent (GB)

(73) Assignee: AIRBUS DEFENCE AND SPACE LIMITED, Stevenage (GB)

( * ) Notice: Subject to any disclaimer, the term of this patent is extended or adjusted under 35 U.S.C. 154(b) by 0 days.

(21) Appl. No.: 14/786,965

(22) PCT Filed: Apr. 25, 2014

(86) PCT No.: PCT/EP2014/058465
§ 371 (c)(1),
(2) Date: Oct. 23, 2015

(87) PCT Pub. No.: WO2014/174080
PCT Pub. Date: Oct. 30, 2014

(65) Prior Publication Data
US 2016/0105356 A1   Apr. 14, 2016

(30) Foreign Application Priority Data

Apr. 26, 2013   (EP) .................................... 13275101

(51) Int. Cl.
*H04L 12/707* (2013.01)
*H04L 12/725* (2013.01)
(Continued)

(52) U.S. Cl.
CPC ............ *H04L 45/22* (2013.01); *H04L 45/302* (2013.01); *H04W 72/04* (2013.01); *H04W 84/18* (2013.01)

(58) Field of Classification Search
None
See application file for complete search history.

(56) References Cited

U.S. PATENT DOCUMENTS 6,201,966 B1 * 3/2001 Rinne ................... H04W 48/14
455/434
6,298,120 B1 * 10/2001 Civanlar ................ H04L 29/06
379/219

(Continued)

FOREIGN PATENT DOCUMENTS

CN   101980565 A   2/2011

OTHER PUBLICATIONS

Extended European Search Report for European Patent Application No. 13275101.7 dated Jul. 12, 2013, 6 pages.

(Continued)

*Primary Examiner* — Andrew C Oh
(74) *Attorney, Agent, or Firm* — Greer, Burns & Crain, Ltd.

(57) ABSTRACT

Data is routed within a data network (8), for example a mobile ad hoc network (MANET), comprising at least one wireless network node (10), typically having a router (11). A processor (18) analyzes characteristics of a wireless link (12*ab*) between a pair of nodes (10*a*, 10*b*) within the network (8). Following such analysis, the processor (18) assigns a link class to the wireless link (12*ab*), the link class being chosen from a predefined set of link classes. A first link class represents that the link (for example link 12*ab*) is suitable for carrying one or more types of traffic (for example real-time audio and text), but not suitable for one or more other types of traffic (for example real-time video of a certain quality). A second link class represents that a link (for example link 12*ac*) is suitable for two or more types of traffic (for example real-time audio and real-time video) including at least one type of traffic (for example real-time (Continued)

video) not supported by the first link class. Data may then be routed across the network (8) while ensuring that only data of types consistent with the link classes assigned to respective links (12*ab*, 12*ac*, 12*bd*, etc) are transmitted via those links.

19 Claims, 6 Drawing Sheets (51) Int. Cl.
*H04W 72/04* (2009.01)
*H04W 84/18* (2009.01)

(56) References Cited

U.S. PATENT DOCUMENTS

| | | | |
|---|---|---|---|
| 6,594,688 B2* | 7/2003 | Ludwig | G06Q 10/10 370/286 |
| 8,305,996 B2 | 11/2012 | Rahman et al. | |
| 9,210,647 B2* | 12/2015 | Ikemoto | H04W 40/30 |
| 2007/0147313 A1* | 6/2007 | Braam | H04L 45/00 370/338 |
| 2007/0255854 A1* | 11/2007 | Khosravy | H04L 67/1095 709/248 |
| 2008/0037477 A1* | 2/2008 | Axelsson | H04L 45/02 370/338 |
| 2008/0084882 A1* | 4/2008 | Eruchimovitch | H04B 7/18508 370/392 |
| 2008/0108352 A1* | 5/2008 | Montemurro | H04L 43/0847 455/437 |
| 2008/0137669 A1* | 6/2008 | Balandina | H04L 45/00 370/400 |
| 2008/0147864 A1* | 6/2008 | Drogo De Iacovo | H04L 29/06027 709/226 |
| 2008/0176577 A1* | 7/2008 | Bourlas | H04L 5/023 455/454 |
| 2009/0010258 A1* | 1/2009 | Ayoub | H04W 72/10 370/392 |
| 2009/0147723 A1* | 6/2009 | Fang | H04L 45/302 370/315 |
| 2009/0262652 A1* | 10/2009 | Tourolle | H04L 45/26 370/248 |
| 2009/0286523 A1* | 11/2009 | Cotevino | H04L 29/06027 455/418 |
| 2010/0227611 A1* | 9/2010 | Schmidt | H04W 4/06 455/434 |
| 2011/0021202 A1* | 1/2011 | Rosen | H04W 72/087 455/450 |
| 2011/0044276 A1* | 2/2011 | Albert | H04L 1/1854 370/329 |
| 2011/0261706 A1* | 10/2011 | Fujiwara | H04B 3/54 370/252 |
| 2012/0002615 A1 | 1/2012 | Thales | |
| 2012/0122461 A1* | 5/2012 | Hossain | H04W 72/085 455/450 |
| 2012/0263066 A1* | 10/2012 | Hurwitz | H04L 45/302 370/252 |
| 2013/0198245 A1* | 8/2013 | Kagan | H04L 67/06 707/812 |
| 2014/0068113 A1* | 3/2014 | Yang | G06F 13/4068 710/16 |
| 2014/0358425 A1* | 12/2014 | Seth | G06F 16/29 701/438 |
| 2015/0004931 A1* | 1/2015 | Rahim | H04W 4/24 455/406 |

OTHER PUBLICATIONS

Communication pursuant to Article 94(3) EPC for European Patent Application No. 13275101.7 dated Jun. 5, 2015, 4 pages.
Farkas, Karoly et al., "Link Quality Prediction in Mesh Networks," Computer Communications (2008), 16 pages.
Katz, D. et al., "Traffic Engineering (TE) Extension to OSPF Version 2," Sep. 2003, 13 pages.

* cited by examiner

ROUTING DATA WITHIN A COMMUNICATIONS NETWORK

FIELD OF THE INVENTION

The present invention concerns routing data within a communications network. More particularly, but not exclusively, this invention concerns a method of routing traffic within a data network comprising at least one wireless network node. The invention also concerns a mobile ad hoc network, a network node for use in such a network, and a computer software product for use within such a network.

BACKGROUND OF THE INVENTION

The present invention seeks to improve communication across a network which includes mobile wireless network nodes, for example a mesh network. Such mobile wireless network nodes may be deployed as part of an ad hoc network required at short notice, for example, when emergency services attend an incident at which telecommunication facilities are required to be provided quickly on-site. (Such a mobile ad hoc network may sometimes be referred to as a MANET.) Hard-wired, mobile phone, 3G, 4G, and satellite communications systems are not always readily available or convenient to use and as such radio-based mobile wireless network access points may need to be rapidly deployed to provide an effective communications system on the ground. In certain circumstances, there may be movement of the network access points/nodes in the network. The ability to transmit data from one node to another may change rapidly according to local environmental conditions.

Commercially available routing algorithms typically choose a shortest or lowest cost path with no regard for the traffic that is being conveyed across it. Such algorithms are well suited to stable networks where links between nodes tend not to change significantly over time. Such algorithms can therefore afford to be rather time-consuming and network-resource intensive if such an investment of resources pays off with enhanced efficiency for the long-term. Such algorithms are however of little use when assessing the best route for data to be sent within a rapidly changing ad hoc network. Cisco Systems Inc for example have proposed the benefits of a policy governed network within a business's IT set-up, but in the context of allowing network managers the ability to manage the use of a network by different users and for various types of data and/or services in a manner that fits in with the objects of the business (see for example the "white paper" available at the following URL: www.cisco-.com/en/US/prod/collateral/vpndevc/ps5712/ps11640/white_paper_c11-663616.pdf It is also known to provide layered mechanisms which prioritise data on a link-by-link basis (termed Per-Hop Behaviour), identify the data type according to the application that generated it, and allocate a Per-Hop Behaviour to the data.

U.S. 2011/0110309 discloses network node devices which cooperatively route traffic flow amongst wired and wireless networks by employing multi-path management processes. The possibility of a network device, programmed with a multi-path management software product, determining a particular path partly in dependence on the type of data is disclosed.

WO 2010/028311, relating to "enhanced wireless ad hoc communication techniques", discloses the concept of generating a cost-based routing matrix for a network node which results in a routing table which takes account of traffic type, for example by means of weighting according to traffic type.

The patent publications mentioned above provide suggestions for sophisticated routing of traffic across networks including wireless nodes, including taking account of the type of data being transmitted, but would appear to represent overly complicated solutions that might be difficult to implement efficiently in practice, especially in the context of routing data efficiently in a fast changing wireless ad hoc network, where the conditions of the network may change so rapidly as to render such sophisticated systems of little practical use.

The present invention seeks to mitigate one or more of the above-mentioned problems. Alternatively or additionally, the present invention seeks to provide an improved method of routing traffic within a data network.

SUMMARY OF THE INVENTION

The present invention provides, according to a first aspect, a method of routing traffic within a data network. The invention is of particular application in relation to a network comprising at least one wireless network node. The method comprises a step of a processor analysing one or more characteristics of a link, for example a wireless link, between two nodes within the network. The processor may be provided separately from the node or may be provided as part of the network node, for example belonging to a router which forms at least part of the node. In response to the analysing step, the processor assigns a link class to the link, the link class being chosen from a predefined set of link classes. The set of link classes may for example comprise a first link class and a second link class, the first link class representing that the link is suitable for carrying one or more types of traffic (for example data representing simple plain text), but not suitable for one or more other types of traffic (for example streamed video), and the second link class for representing that the link is suitable for two or more types of traffic (for example both streamed video and streamed audio) including at least one type of traffic different from those types of traffic supported by a link according to the first link class. The method also includes a step of routing data across the network, and advantageously ensuring that only data of types consistent with the link class assigned to each link are transmitted via those links. This may be achieved by means of the processor adding/amending certain pre-set routing rules as used by a router at at least one of the nodes linked by the link. Embodiments of the present invention thus, advantageously, provide for an automated and dynamically adapting mechanism by which there is effectively an explicit pro-active declaration that a link is and will, for at least the short term, be capable of supporting a certain data type (and possibly not other types), and routing data accordingly. Thus, each network node in a network of the present invention can dynamically control the routing of data depending on its content.

The step of the processor analysing one or more characteristics of the wireless link could be carried out at a particular instant in time, and the link class assigned solely on the instantaneous measurements, without regard to historical measurements. More preferred however is for the analysis to take into account the way in which the one or more characteristics change over time. For example, trends may be taken into account. Thus, the processor may, when assigning a link class to a link, take into account one or more characteristics of the link between two nodes within the network both at a first time and at a second time, different from (for example earlier than) the first time. Historical characteristics may thus be taken into account as well as the present characteristics. Predicted future characteristics may be taken into account as well as the present characteristics. The rate of change of a particular characteristic may be taken into account. Higher order changes in particular characteristics may be taken into account. A link class may be assigned in dependence on a calculated confidence that the link will be suitable for use for transmitting data in accordance with the link class for a period of time (for example a pre-set time period), for example, if the calculated confidence (for example calculated as a probability) exceed a pre-set threshold.

The processor may, when analysing one or more characteristics of a link, assess the bandwidth of the link. The processor may, when analysing one or more characteristics of a link, assess the latency in the link. The processor may, when analysing one or more characteristics of a link, assess the link quality, for example by measuring relative noise in the signal (by a signal to noise ratio measurement for example) and/or by measuring error rates. The processor may, when analysing one or more characteristics of a link, assess the level of jitter. The processor may, when analysing one or more characteristics of a link, assess the average packet loss rate across the link. It will of course be appreciated that a variety of these, and possibly other, characteristics of the wireless link can be assessed by the processor when seeking to classify a link. Any pair of the aforementioned characteristics may be sufficient.

The method of the present invention has particular application in highly mobile dynamic ad hoc networks, and in particular, has particular application in fast changing wireless ad hoc networks. In such networks, the conditions of the network may change so rapidly as to render sophisticated routing processes of little practical use. It is therefore preferable for the method to be relatively simple and therefore quick and easy to implement and use in practice. It may therefore be preferred for there to be no more than twenty different link classes within the predefined set of link classes. Preferably there are no more than ten different link classes within the set. One or more classes may for example be defined such that traffic representing video, for example real-time (or streamed) video is supported by a link according to that link class, but not supported by a link according to at least one other link class in the set (and possibly not supported by a link according to at least two other link classes in the set). One or more classes may for example be defined such that traffic representing audio, for example real-time (or streamed) audio is supported by a link according to that link class, but not supported by a link according to at least one other link class in the set. The set of link classes may comprise a first link class, a second link class, and a third link class.

The method preferably includes a step in which at least one node in the network publishes to all of its neighbouring nodes the link class assigned to each link established with that node. The method preferably further includes a step such that at least one such neighbouring node then re-publishes such information to one or more other nodes in the network. The method may include a step in which a routing table is created (or updated) with such link class information, for example within a router associated with each node.

The data network will typically comprise a multiplicity of nodes and a multiplicity of active communication links between pairs of such nodes. At least some of those links may be wireless links. Some links may be wired links. The method preferably includes assigning a link class to each active link in the network. Data may then be routed across the network whilst ensuring that only data of types consistent with the link classes assigned to the links are transmitted via those links. The network, controlled by the method of the present invention, may be connected to other networks, not so controlled. The network may be a MANET. The network may be in the form of any variable network.

During performance of the method, at least one (for example wireless) network node may move from a first location to a second location, separated from the first location by a significant distance. The distance between the first location and the second location may be more than 10 m, and may be more than 50 m. The distance between the first location and the second location may more than 100 m. In some networks, one or more of the mobile nodes may move by considerable distances during operation of the network, for example by more than 500 m and sometimes more than 1 km. In some networks, more than one node, particularly wireless nodes, may move from one location to another. The method may therefore include a step of physically moving at least two wireless network nodes.

As mentioned above, it is therefore preferable for the method to be relatively quick to operate in practice. The method is preferably such that the time taken by the processor to perform both the step of analysing the link between two nodes within the network and then assigning a link class to the link, is less than 10 seconds, and more preferably less than 1 second. The time taken by the processor to perform both the analysing step and the step of assigning the link may be less than 250 milliseconds. The steps of analysing a link between two nodes and then assigning a link class to the link may be performed many times over a period of time, and are preferably performed regularly. The steps may be performed at a frequency determined by the rate at which the characteristics of the links in the network change. In a fast-changing dynamic network the steps may be performed at least once every 10 minutes, and possibly as often as five or more (or even ten or more) times every 10 minutes.

The present invention also provides, according to a second aspect of the invention, a mobile ad hoc network comprising at least one network node (for example a wireless node) associated with a processor programmed with software so as to perform the method of the first aspect of the invention as described or claimed herein. The software may thus comprise a module for analysing characteristics of a link between a pair of network nodes. The software may comprise a module for assigning a link class to a link. The software may comprise data concerning the different link classes, for example, defining each link class in a predefined set of link classes. The software may comprise data relating the different link classes to criteria concerning measured link characteristics. The software may comprise data that is used to form, or otherwise defines, a routing table. Any or all such data, as forming part of the software—or accessible to the processor when programmed with software—may be reconfigurable. The software may further comprise other modules for performing other steps of the method of the first aspect of the present invention. There may be other data, either forming part of the software or accessible to a processor when programmed with software, to allow the method of the first aspect of the invention to be performed with the use of a network device having a processor programmed with the software.

The present invention also provides, according to a third aspect of the invention, a mobile network node including a router, a wireless networking communications apparatus for transmitting and receiving data wirelessly, and a processor programmed with software so as to perform the method of the first aspect of the invention as described or claimed herein.

The present invention also provides, according to a fourth aspect of the invention, a computer software product for use relation to any aspect of the invention as described or claimed herein.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

FIGS. 1 to 5 illustrate a first embodiment of the present invention. The first embodiment provides a way of speedily determining a path, for a particular media type, from a given node to a destination node across a dynamically changing communications network by means of classifying routes across the network as being suitable for particular types of data, whilst blocking other types of data from being transmitted across certain links in the network.

Figure 1:
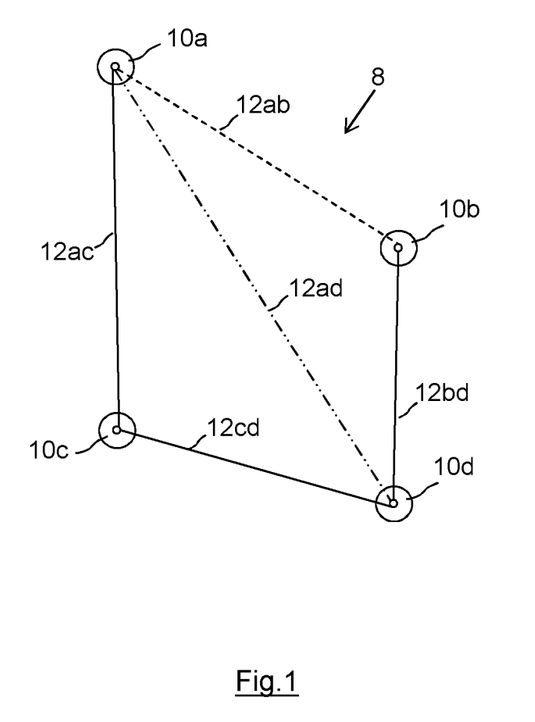
FIG. 1 shows a data network according to a first embodiment of the invention in a first state.

FIG. 1 is a schematic representation of a data network 8 comprising four mobile wireless network nodes, namely a first node 10a, a second node 10b, a third node 10c, and a fourth node 10d. The network nodes each comprise a router, with integrated processor and memory, and an associated radio communication transmitter/receiver and antenna. The network 8 as shown in FIG. 1 shows that wireless communication between the first and second nodes 10a, 10b is provided by a link 12ab, wireless communication between the first and third nodes 10a, 10c is provided by a link 12ac, wireless communication between the first and fourth nodes 10a, 10d is provided by a link 12ad, wireless communication between the second and fourth nodes 10b, 10d is provided by a link 12bd, and that wireless communication between the third and fourth nodes 10c, 10d is provided by a link 12cd. FIG. 1 shows the network 8 at a time, t=T$_1$ in a first state. In this first state, the links 12ac, 12cd, and 12bd are each declared (by the associated routers for example) to be suitable for carrying traffic of any data type including real-time video, real-time audio and text. The link 12ab is however declared to be suitable for carrying only real-time audio and text, it being judged to be not suitable for carrying real-time video data (of a given minimum quality) reliably.

Also, the link 12ad is declared to be suitable for carrying only text, it being judged to be not suitable for carrying either real-time audio or real-time video data reliably. The routers 10 linked by each such link 12, periodically update and publishes to other routers in the network the data types to be carried by the established links 12 between routers 10. Routing tables are dynamically produced by each router for each data type, such that for certain data types there will be different routes available across the network. In the first state of the network, as shown in FIG. 1, text data may be transmitted between the first node 10a and the fourth node 10d, via one of three possible routes: via the second node 10b using links 12ab and 12bd, via the third node 10c using links 12ac and 12cd, or directly using link 12ad. The path chosen is the route that is most closely suited to the data type being transmitted, whilst also taking into account the overall Quality of Service policies of the network operator, and not allowing a data type to travel via a link which has been declared as belonging to a class of link not suitable for carrying that data type. Thus, in this case, the direct link 12ad which has been declared only suitable for use for text will be used for a text-based communication. Similarly, real-time audio data communication would be most appropriately transmitted via the second node 10b using links 12ab and 12bd, and real-time video data would be most appropriately transmitted via the third node 10c using links 12ac and 12cd.

Figure 2:
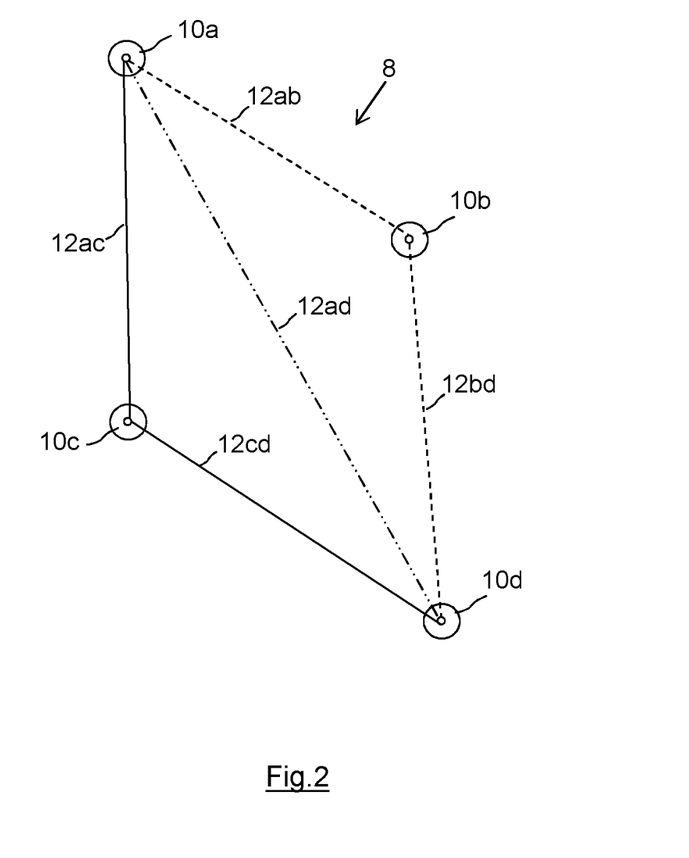
FIG. 2 shows the data network of FIG. 1, but in a second state.

FIG. 2 shows the network 8 of FIG. 1 at a time, t=T$_2$ in a second state. In this second state, the fourth node 10d has physically moved to a new location, affecting the link 12bd between it and the second node 10b. It will be seen that in this second state, the links 12ac, and 12cd only are each declared to be suitable for carrying traffic of any data type; link 12ab and (newly) 12bd are declared to be suitable for carrying only real-time audio and text, and not real-time video; and link 12ad is declared to be suitable for carrying only text, not real-time audio or real-time video.

Figure 3:
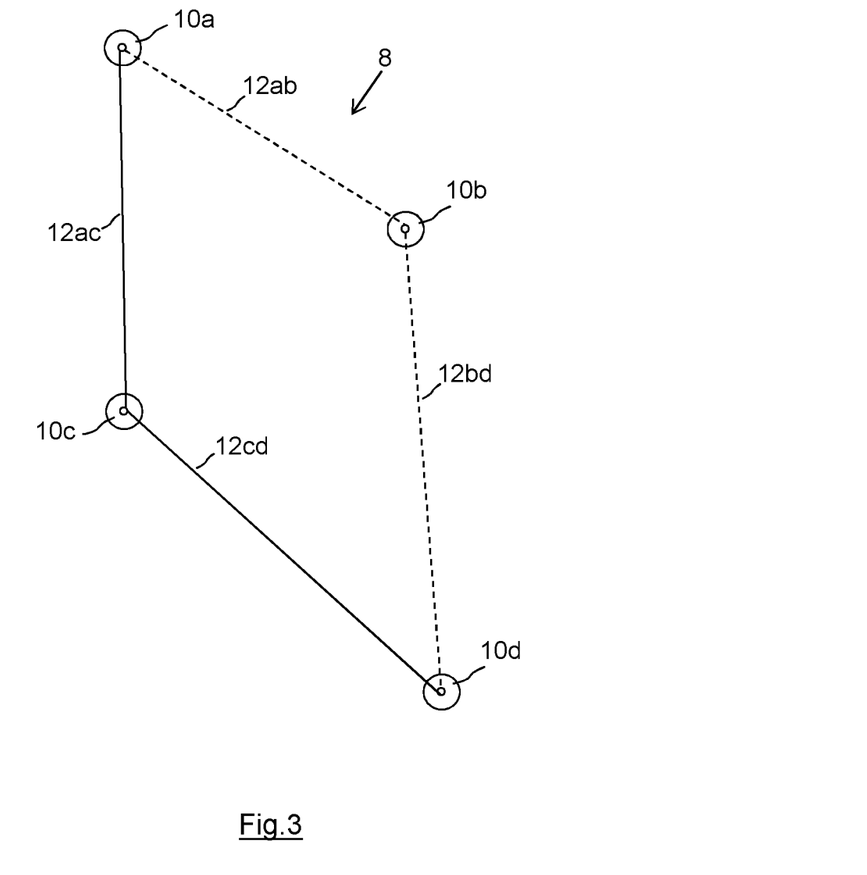
FIG. 3 shows the data network of FIG. 1, but in a third state.

FIG. 3 shows the network 8 of FIG. 1 at a time, t=T$_3$ in a third state. In this third state, the fourth node 10d has physically moved to a new location, yet further away from the other nodes in the network. In this state, the direct link between the first node 10a and the fourth node 10d has been lost. It will be seen that in this third state, the links 12ac, and 12cd are each declared to be suitable for carrying traffic of any data type; whereas links 12ab and 12bd are declared to be suitable for carrying only real-time audio and text, and not real-time video.

Figure 4:
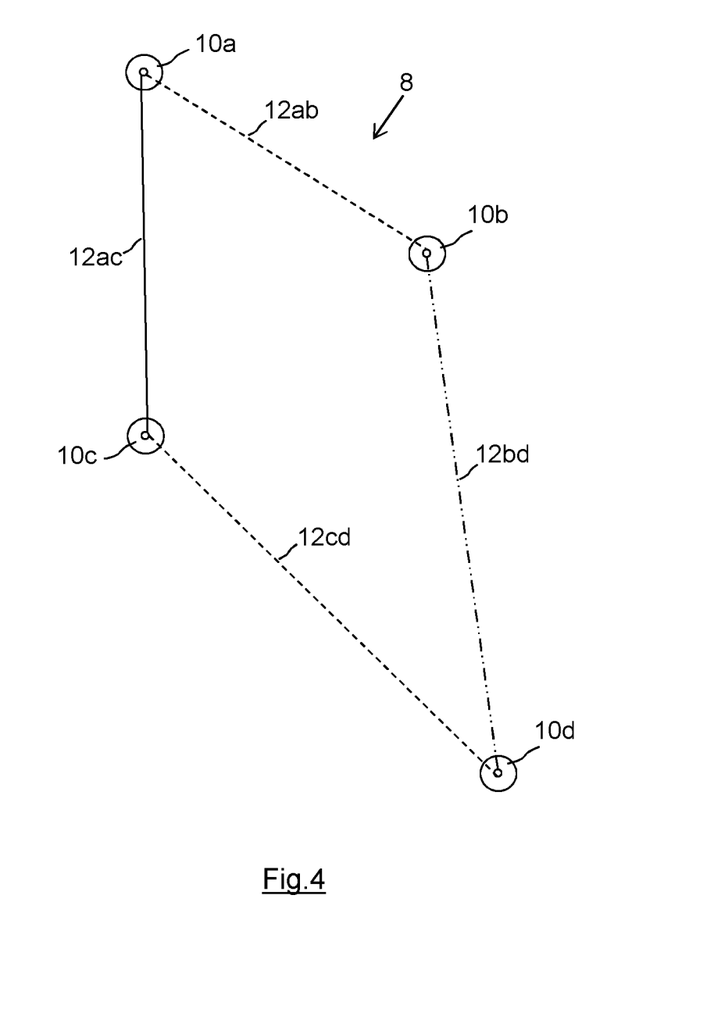
FIG. 4 shows the data network of FIG. 1, but in a fourth state.

FIG. 4 shows the network 8 of FIG. 1 at a time, t=T$_4$ in a fourth state. In this fourth state, the fourth node 10d has physically moved to a new location, yet further away from the other nodes in the network. In this state, there is still no direct link between the first node 10a and the fourth node 10d and also the links 12bd, 12cd, between the second node 10b and the fourth node 10d and between the third node 10c and the fourth node 10d, are adversely affected. It will be seen that in this fourth state, only link 12ac is declared to be suitable for carrying traffic of any data type; links 12ab and 12cd are declared to be suitable for carrying real-time audio and text, but not real-time video, and link 12bd is declared to be suitable for text data only. In this fourth state, the state of the network is such that there is now no possibility (according to the routers in the network) to send real-time video between the first node 10a and the fourth node 10d. Real-time audio data can be carried between nodes 10a and 10d, via one route only: via node 10c using links 12ac and 12cd. Data of text-type can be carried between nodes 10a and 10d, via two routes: firstly, via node 10c using links 12*ac* and 12*cd*, and secondly, via node 10*b* using links 12*ab* and 12*bd* (the second route being the preferred route).

Each network node may be provided by different type of equipment. Some network nodes will be mobile and there will be an expectation that the physical position of the node will change rapidly with time, thus requiring a dynamically adapting network. Other network nodes may be primarily static, but provided on an ad hoc basis. Weather conditions or other environmental conditions may change quickly, affecting the quality of wireless communication between nodes in the network. All nodes in the embodiment illustrated by FIGS. 1 to 4 are in the form of radio-based ("wireless") routers. It will be appreciated that one of the routers may be connected to a base unit that serves as a central communications hub. Such a hub may be connected to one or more further networks, including for example an IP (Internet Protocol)-based network such as the Internet. Such a connection may be provided by a satellite-based communications link. The hub node may act as a base station node. Other than the dynamic classification of links as being suitable only for certain classes of data type as described in relation to this present embodiment of the invention, standard protocols are used in the wireless network communication across the network (as used in state-of-the-art IP networks).

Figure 5:
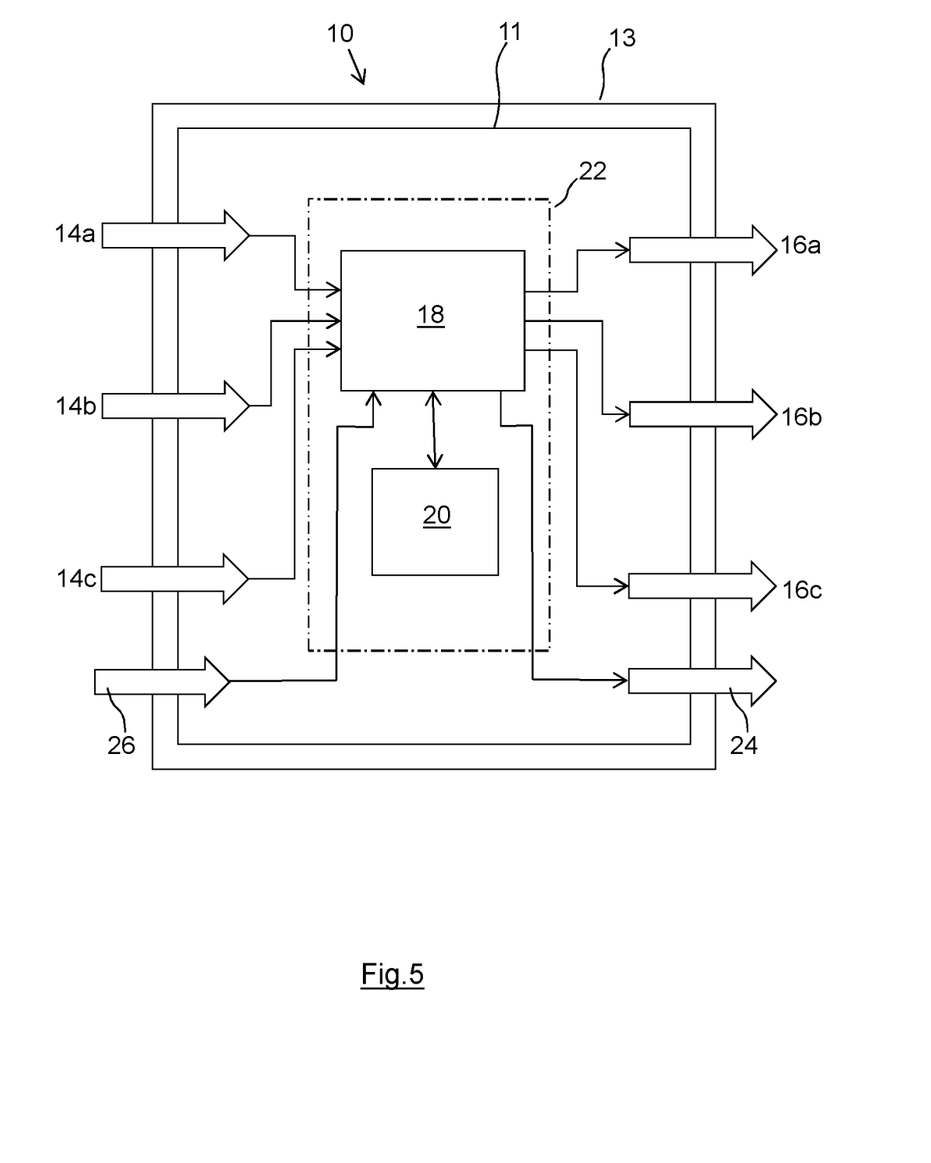
FIG. 5 shows the architecture of one of the nodes of the network of FIGS. 1 to 4.

The basic architecture and function of each network node in the network will however be as set out below with reference to FIG. 5 of the attached of the accompanying drawings. As shown schematically in FIG. 5, each node comprises a router 11 connected to a network termination unit 13. Thus the node 10 comprises the ability to receive data transmitted via links with other nodes in the network, represented schematically by incoming channels 14*a*, 14*b* and 14*c*, and the ability to transmit data transmitted via links with other nodes in the network, represented schematically by outgoing channels 16*a*, 16*b* and 16*c*. The channels of communication (links between nodes) will typically be symmetrical such that each node will at any given time be able both to transmit and to receive data via an established communications link with another node. The node also broadcasts signals 24 for reception by any compatible node of the system within range and has an input 26 for receipt of such signals. It will of course be appreciated that the links shown in the Figures as existing between adjacent nodes are schematic representations of the lines of communications between nodes and that each node receives and transmits signals wirelessly via a conventional antenna. Equally, the separate channels 14*a* to 16*c*, and broadcast channel 24 shown in FIG. 5 are a schematic representation of the function of the inputs and outputs of the node, formed by the combination of the router 11 and network termination unit 13. In reality, wireless signals are received and transmitted via one or more antennae of the network termination unit 13, and will be subject to time/frequency division multiplexing to form the separate channels for communication. Alternatively, or additionally, standard wireless communication protocols are employed as appropriate for allowing many nodes to share one communication channel when transmitting/receiving data.

The router 11 includes a processor 18 with an associated memory 20. The memory includes routing tables in which tables are included information on the types of data that each link/route is currently able to support. Data sent across the wireless network may be encrypted using standard protocols, the encryption of data being represented by the broken line 22.

The router periodically assesses the characteristics of a given wireless link between its associated node and all other nodes to which it is directly linked, at that time. The number of times the router assesses the characteristics of a given wireless link per hour will typically be determined on a case by case basis. In some scenarios where one or more nodes are expected to be moving rapidly from one location to another, or for there to be rapid changes in the local environment of a kind likely to affect communication between nodes, the assessment of a link may be carried out one or more times every minute. In other circumstances ten assessments, or fewer, per hour may be sufficient. The frequency of such assessments may be varied dynamically in view of a measure of the variation in successive assessments, or in dependence on triggers caused by other measurable changes in the network. Data is collected at a given instant in time, $t=T_i$, concerning the bandwidth available, $B_i$, available, the average latency $L_i$, in the link and a measure of link quality, $Q_i$, (in this case effected by means of a measure of signal-to-noise ratio) and stored in memory 20. Previous measures also stored in memory 20 are retrieved and used, in conjunction with the most recently assessed parameters, $B_i$, $L_i$, and $Q_i$, to enable the processor 18 to generate a prediction of the capability of the link to carry reliably data of a certain type until the next assessment. This is achieved by using the historic measurements (giving an indication of the trends/rates of change in the system) and the present measurements to generate an indication of the ability of the link to sustain certain data types (by means of comparison against pre-set thresholds). For example, a real time video of a particular resolution and frame rate, when streamed in accordance with a particular protocol, may have minimum (pre-set) requirements (limits) for the bandwidth available, the average latency in the link and the error rate (link quality) over a given period of time (say of the order of five minutes). With knowledge of the available bandwidth, the average latency and link quality at a given instant and with the knowledge of the trend, over time, in view of historical data, in the changes in such parameters, it is possible to predict a likelihood that the available bandwidth, the average latency and link quality will be maintained within the acceptable limits for the given period of time. If the confidence (the calculated likelihood) is sufficiently high (above a threshold value) then the link may be declared suitable for video streaming. If not, the instantaneous available bandwidth, the average latency and link quality of the link, and future predicted trends may still indicate that the wireless link is suitable for streaming real-time audio (or VoIP) for a (possibly different) given period of time, or suitable for a data type having yet lower demands. Accordingly, the node then assigns to the link a label that characterises the types of data able to be carried by the link. The network node then publishes to its neighbouring nodes those data types supported by each of its active links. Each network node in turn re-publishes this information to its neighbouring nodes, and so-on, until each network node in the network is able to formulate the information gathered into a routing table that shows one or more paths (comprising a number of links) across the network for a particular data type.

The routing tables in the memory 20 are updated. By so doing, routing functions within the routers are able to select a path across the network that has a high probability of a successful transmission of data, according to the particular type concerned. By distributing the status of each link with regard to the data types supported, rather than the assessed parameters themselves, there is less variation in the status updates leading to a less frequent need to distribute the updates, minimising the data exchanges relating to this information. In a dynamically changing network, it is sufficient to have an approximation of the suitability of the link to carrying certain types of data, perhaps being assigned a label selected from amongst a small number (5 or fewer for example), than a very accurate assessment of the communication characteristics of the link, given that the accuracy and precision of such a characterisation will be out of date within a time-period of a comparable length to that taken to make such an assessment. It is better therefore to have a rough-and-ready assessment of all links in the network that is quick but good enough to allow for data transmission quickly after the assessment has been initiated.

The types of data are categorised according to a standard, known to all nodes in the network. In the present embodiments, the standard used is the Multipurpose Internet Mail Extensions (MIME) standard as set out in the Internet Engineering Task Force's (IETF) Network Working Group's RFC ("Request for Comments") Document No. 2046. The types are classified into a small number of main types which may each have further sub-classification. The five discrete top-level media types are defined as text, real-time audio, image (e.g. JPEG), real-time video (MPEG), and application (e.g. other data files such as spreadsheets, word processing data files, certain executable files, and the like). The MIME standard also includes two composite top-level media types, namely "multipart" (data consisting of multiple entities of independent data types) and "message" (an encapsulated message), which can be treated separately in the present embodiment but could alternatively be treated together with "applications" in a generic "miscellaneous" category of data.

Thus, it will be seen that the present embodiment provides an improved method of routing traffic within a data network, by means of a providing at each node a processor which analyses the performance of the respective wireless links between the node and neighbouring nodes within the network; then assigns a link class (e.g. one or (a) all data types suitable, (b) text and real-time audio, but not real-time video, allowed, and (c) text data only allowed) to each wireless link, and then disseminates such information throughout the network, the network then routing data such that only data of types consistent with the link class assigned to the wireless links are transmitted via those wireless links.

Figure 6:
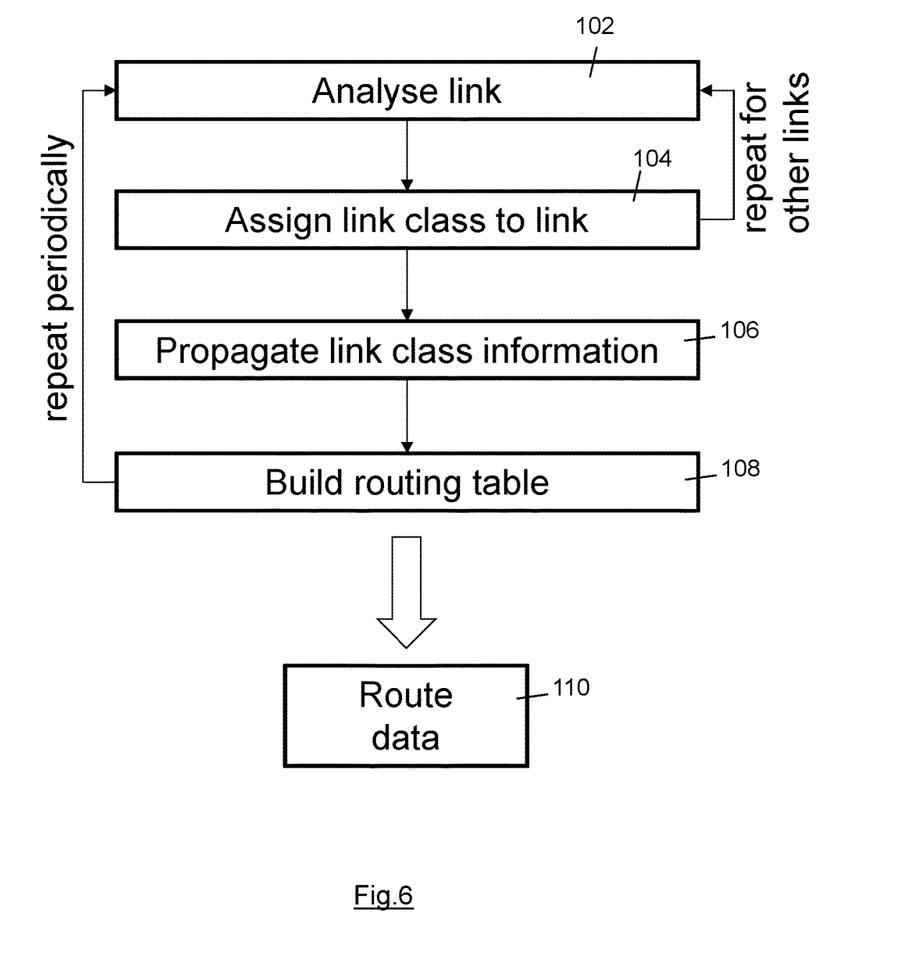
FIG. 6 is a flowchart illustrating the method of operation of a data network according to a second embodiment of the invention in a first state.

A second embodiment will now be described with reference to the flow-chart shown in FIG. 6. The first and second embodiments are closely related and aspects of one embodiment can readily be incorporated into the other. The flow-chart of FIG. 6 shows the steps taken by a router, which acts as a node in a telecommunications network. The router includes a processor which performs the various steps shown in FIG. 6. Thus, periodically, the router performs a sequence of steps 102-108 that collectively define one or more routing tables that define routes across a network according to which of a small number of different data types are to be sent across the network. The routing tables are adapted on the basis of an explicit declaration being made by a network device concerning which of the different data types can be carried across a link between two nodes in the network. Thus, as a first step 102, characteristics of the wireless link between two nodes within the network are analysed. The characteristics assessed include measures of bandwidth, latency, jitter, packet loss rate, and error rate. The step 102 includes both querying the status of the link at the present moment and considering a historical log (compiled from previous instantaneous measurements) to gauge the trend in the performance of the link over time. Both the measurements from the instantaneous query and the historical log information are then translated into a form allowing an assessment of the performance of the link in the short term (immediate), medium term (for example, the expected performance within the next few tens of seconds) and longer terms (for example, the expected performance within the next few minutes or longer). It will be appreciated that the medium-term and the long-term may be judged over shorter or longer time periods depending on the circumstances and the context in which the ad hoc network is used. Since different forms of traffic place different requirements on the routing and link transport infrastructure, the suitability of a particular link for transporting traffic between two software applications should be considered on a case-by-case basis. It will of course be appreciated that high quality streamed video requires a link with high bandwidth, low error rate, low jitter, and low packet loss for example. Large data files may however be transferred perfectly satisfactorily despite jitter and packet loss (provided such packet loss is detected and remedied by appropriate protocols). Static routes for certain types of data are injected into the router (or such routes updated) such that the static routes take precedence for those types of data and ensure that a link of a declared class is not allowed to transport data of a type incompatible with that link class.

The manner and method of the querying of the status of the link as performed during step 102 may be performed in accordance with any suitable protocol. It is envisaged that the Dynamic Link Exchange Protocol (DLEP) currently under development in the Internet Engineering Task Force will be suitable for example. The important factor is the ability to extract the instantaneous readings from the network device. The exact readings will vary according to the type of network device; some readings may be obtained directly from equipment located in the network device, and some readings may be derived from several direct readings and processed to a form that the router is able to understand. Examples of the former may be signal-to-noise (SNR) ratio, or energy per bit to noise power spectral density ratio ($E_b/N_o$). For the latter, according to the type of network device, and knowing the modulation and error correction schemes, it is possible to calculate or empirically measure the raw data rate (in bit/s) that the link can sustain. When a network device, such as a wireless device, is able to automatically compensate for degraded transmission conditions, such as engaging a less complex modulation scheme or by increasing the amount of Forward Error Correction being used, the status reports on changing modulation scheme or Forward Error Correction could indicate link instability. In addition, where a wireless device is part of a cellular or trunked radio system, information such as cell identity may be relayed according to the location of the device in the network, and, when taken together with positional status reports, it is possible to ascertain when cell handovers are likely to occur or when coverage is likely to be lost altogether.

Wired and/or wireless links may be analysed and categorised by the above-described method.

There are a finite number of different classifications of link suitability, which may be defined on a case-by-case basis. In this embodiment there are nine different classes of link:

Class 1—plain text/simple data transmission (at low data transfer rate)—low importance/criticality, Class 2—plain text/simple data transmission (at low data transfer rate)—high importance/criticality (able to carry class 1 traffic too), Class 3—non-streaming data transmission (at medium data transfer rate)—low importance/criticality (able to carry class 1 traffic too), Class 4—non-streaming data transmission (at medium data transfer rate)—high importance/criticality (able to carry class 1 to 3 traffic too), Class 5—streaming audio transmission (low quality—low bit-rate) (able to carry class 1 to 4 traffic too), Class 6—streaming audio transmission (high quality—high bit-rate) or non-streaming data transmission at high data transfer rate (able to carry class 1 to 5 traffic too), Class 7—streaming video transmission (low quality) (able to carry class 1 to 6 traffic too), Class 8—streaming video transmission (medium quality) (able to carry class 1 to 7 traffic too), and Class 9—streaming video transmission (high quality) (able to carry class 1 to 8 traffic too).

As step 104, the most appropriate link class is chosen from the above nine levels and assigned to the link under consideration, in consideration of the short-term, medium term and long-term assessment of the characteristics of the link. Lookup tables and thresholds are set to allow such a classification to be undertaken quickly and automatically. The analysis and link class assignment steps 102, 104 are repeated for each link in the network. Each router also periodically propagates such link class information to its neighbours and builds/updates a routing table on this basis of the link class information concerning the network, as may be available to it, as represented by steps 106 and 108 in FIG. 6. As shown in step 110, such information may then be used to allow quick and efficient routing of data across the network in a manner that is appropriate for the type of data being transmitted. By way of example, to send a live streaming video using a mathematically complex video encoding method requires that a link between source and destination be relatively stable with a low bit error rate over a long period of time, with reasonable bandwidth availability, since any errors will cause significant degradation of the video at the receiver. Such a link must belong to class 9. To send a short, low priority, message consisting entirely of ASCII characters, the link only needs to be stable for the short time that the message is being sent, and requires minimal bandwidth, requiring the use of a link of any of classes 1 to 9.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

The network described above is decentralised, with each node being independently managed. One or more nodes could alternatively be managed by a central server in communication with each such centrally managed node.

The communication between nodes will typically be via a packet-switch communication mode. Some communication between nodes could be via a circuit-switched communication mode, possibly a virtual circuit-switched mode.

Other measures of link quality could be used, in addition to, or instead of the signal-to-noise ratio. For example, error correction rate data could be used. Also, other parameters could be measured in addition to or instead of bandwidth available and latency.

Not all MIME types and sub-types need be explicitly dealt with. The system may be configured for example such that only a subset of Media Types are announced and dealt with by the nodes so that only those types typically used in a particular business enterprise/particular application are catered for. Other sets of data types, not consistent with the MIME standard could be used, according to the needs to the user/enterprise using the network.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A method of routing traffic within an ad hoc data network comprising a multiplicity of nodes, wherein
   each node comprises a router having a processor and associated memory,
   the nodes including at least one mobile wireless network node that is moveable with respect to the other nodes in the network, the mobile wireless network node having one or more antennae for transmitting and receiving data via radio signals, and wherein the method comprises the steps of:
   the processor of the router of at least one of the nodes analysing one or more characteristics of a wireless link between the mobile wireless node and one of the other nodes within the network;
   in response to the analysing step, the processor assigning a link class to the wireless link, the link class being chosen from a predefined set of link classes comprising:
   a first link class for representing that the link is suitable for carrying one or more types of traffic including at least one of text or image, but not suitable for one or more other types of traffic including at least one of real-time audio, real-time video or application, and
   a second link class for representing that the link is suitable for two or more types of traffic including at least one of text, image or real-time audio and at least one type of traffic different from those types of traffic supported by a link according to the first link class but not suitable for one or more other types of traffic including at least one of real-time video or application;
   a third link class for representing that the link is suitable for three or more types of traffic including at least one of text, image, real-time audio, real-time video or application and at least one type of traffic different from those types of traffic supported by a link according to the second link class;
   dynamically producing and updating routing tables in the associated memory of the router with information on the types of data that the wireless link or a route comprising the wireless link is currently able to support; and
   routing data across the network using the routing tables in the associated memory of the router while ensuring that only data of types consistent with the link class assigned to the wireless link are transmitted via the wireless link, and wherein the steps of analysing one or more characteristics of the wireless link and then assigning a link class to the wireless link are performed at least once every 10 minutes; and wherein each node publishes information comprising each link class for each of that node's link to neighboring nodes, and wherein each neighboring node re-publishes the information to neighboring nodes of the neighboring node.

2. A method according to claim 1, wherein the step of the processor assigning a link class to the wireless link includes analysing trends of said one or more characteristics of the wireless link.

3. A method according to claim 1, wherein each of the following characteristics of the wireless link are assessed by the processor during the step of analysing: bandwidth, latency, and link quality.

4. A method according to claim 1, wherein there are no more than ten different link classes within the predefined set of link classes.

5. A method according to claim 1, wherein the method includes a step in which at least one node in the network publishes to all of its neighbouring nodes the link class assigned to each link established with that node, and at least one such neighbouring node re-publishes such information to one or more other nodes in the network.

6. A method according to claim 1, wherein the multiplicity of nodes comprise a multiplicity of active communication links between pairs of such nodes, and wherein the method includes assigning a link class to each such active link, and routing data across the network whilst ensuring that only data of types consistent with the link classes assigned to the links are transmitted via those links.

7. A method according to claim 1 wherein the method includes moving said at least one mobile wireless network node from a first location to a second location relative to at least one other network node, the second location being separated from the first location by a distance of more than 100 m.

8. A method according to claim 1 wherein the method includes physically moving at least two wireless network nodes relative to a third network node.

9. A method according to claim 1, wherein the first, second and third link classes are defined such that traffic representing real-time audio is supported by a link according to the second link class, but not by a link according to the first link class and traffic representing real-time video is supported by a link according to the third link class, but not by a link according to the first or second link classes.

10. A method according to claim 1, wherein the time taken by the processor to perform both the step of analysing the wireless link between two nodes within the network and then assigning a link class to the wireless link, is less than 1 second.

11. A mobile ad hoc network comprising at least one wireless network node associated with a processor programmed with software so as to perform the method of claim 1.

12. A mobile network node including a router, a wireless networking communications apparatus for transmitting and receiving data wirelessly, and a processor programmed with software so as to perform the method of claim 1.

13. A computer software product for loading onto the processor associated with a mobile network node, wherein the software product is configured to provide a mobile network node according to claim 12.

14. A method according to claim 1, wherein the step of the processor assigning a link class to the wireless link includes analysing trends of said one or more characteristics of the wireless link.

15. A method according to claim 1 wherein the first link class represents that the link is suitable for carrying text, but not suitable for real-time audio and real-time video, and the second link class represents that the link is suitable for text and real-time audio but not suitable for real-time video, and the third link class represents that the link is suitable for text, real-time audio and real-time video.

16. A method of routing traffic within an ad hoc data network comprising a multiplicity of nodes, wherein each node comprises a router having a processor and associated memory, the nodes including at least one mobile wireless network node that is moveable with respect to the other nodes in the network, and wherein the method comprises the steps of:

the processor of the router of at least one of the nodes analysing one or more characteristics of a wireless link between the mobile wireless node and one of the other nodes within the network;

in response to the analysing step, the processor assigning a link class to the wireless link, the link class being chosen from a predefined set of link classes comprising:

a first link class for representing that the link is suitable for carrying one or more types of traffic including at least one of text or image, but not suitable for one or more other types of traffic including at least one of real-time audio, real-time video or application, a second link class for representing that the link is suitable for two or more types of traffic including at least one of text, image or real-time audio and at least one type of traffic different from those types of traffic supported by a link according to the first link class but not suitable for one or more other types of traffic including at least one of real-time video or application; and a third link class for representing that the link is suitable for three or more types of traffic including at least one of text, image, real-time audio, real-time video or application and at least one type of traffic different from those types of traffic supported by a link according to the first link class and the second link class; and routing data across the network while ensuring that only data of types consistent with the link class assigned to the wireless link are transmitted via the wireless link, and wherein the steps of analysing one or more characteristics of the wireless link and then assigning a link class to the link are performed at least once every 10 minutes.

17. A method according to claim 16, wherein the method includes a step of the processor storing in memory a current quality of the one or more characteristics of a wireless link, along with prior qualities of the wireless link and wherein the step of assigning a link class to the wireless link includes the processor retrieving and using the prior qualities along with the current quality to generate a prediction of a capability of the wireless link to reliably carry data of a certain type until a next assessment.

18. A method of routing traffic within an ad hoc data network comprising a multiplicity of nodes, wherein
  each node comprises a router having a processor and associated memory,
  the nodes including at least one mobile wireless network node that is moveable with respect to the other nodes in the network, and wherein the method comprises the steps of:
  the processor of the router of at least one of the nodes analysing one or more characteristics of a wireless link between the mobile wireless node and one of the other nodes within the network;
  in response to the analysing step, the processor assigning a link class to the wireless link, the link class being chosen from a predefined set of link classes comprising:
    a first link class for representing that the link is suitable for carrying at least text data, but not suitable for carrying streamed real-time video, and
    a second link class for representing that the link is suitable for two or more types of traffic including at least one of text, image or real-time audio and at least one type of traffic different from those types of traffic supported by a link according to the first link class but not suitable for one or more other types of traffic including at least one of real-time video or application,
    a third link class for representing that the link is suitable for three or more types of traffic including at least one of text, image, real-time audio, real-time video or application and at least one type of traffic different from those types of traffic supported by a link according to the second link class; and
  routing data across the network while ensuring that only data of types consistent with the link class assigned to the wireless link are transmitted via the wireless link, and wherein
  the steps of analysing one or more characteristics of the wireless link and then assigning a link class to the link are performed at least once every 10 minutes.

19. A method according to claim 18, wherein the method includes
  communicating over a link between the at least one mobile wireless network node and at least one other node using data comprising at least one of audio, video or image data,
  moving the mobile wireless network node causing the quality of the link between the mobile wireless network node to deteriorate,
  in response to the analysing step, then
  communicating over the link using text data only.

* * * * *